(12) United States Patent
Allahut et al.

(10) Patent No.: US 11,093,014 B2
(45) Date of Patent: Aug. 17, 2021

(54) METHOD FOR MONITORING, CONTROL AND GRACEFUL SHUTDOWN OF CONTROL AND/OR COMPUTER UNITS

(71) Applicant: Siemens Aktiengesellschaft, Munich (DE)

(72) Inventors: Gerd Allahut, Greding (DE); Robert Schedlberger, Bad Zell (AT); Erwin Wieland, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 16/275,475

(22) Filed: Feb. 14, 2019

(65) Prior Publication Data
US 2019/0250687 A1 Aug. 15, 2019

(30) Foreign Application Priority Data
Feb. 15, 2018 (EP) .................................. 18156871

(51) Int. Cl.
*G06F 1/30* (2006.01)
*G06F 1/3203* (2019.01)
(Continued)

(52) U.S. Cl.
CPC ............. *G06F 1/30* (2013.01); *G05B 19/042* (2013.01); *G06F 1/3203* (2013.01); *G06F 1/3287* (2013.01); *G05B 2219/24146* (2013.01)

(58) Field of Classification Search
CPC ......... G06F 1/30; G06F 1/3287; G06F 1/3203
See application file for complete search history.

(56) References Cited

U.S. PATENT DOCUMENTS 8,706,879 B2 * 4/2014 Sparks .................... H04L 41/12
709/226
2002/0129355 A1 * 9/2002 Velten ................. G06F 11/3093
717/176
(Continued)

FOREIGN PATENT DOCUMENTS

EP 1832955 9/2007
EP 2787405 10/2014
(Continued)

OTHER PUBLICATIONS

EP Search Report based on EP18156871.8 dated Aug. 31, 2018.

*Primary Examiner* — Jaweed A Abbaszadeh
*Assistant Examiner* — Gayathri Sampath
(74) *Attorney, Agent, or Firm* — Cozen O'Connor

(57) ABSTRACT

A method for monitoring, control and shutdown of control and/or computer units of a system, wherein the control and/or computer units are supplied with power via power supply components, where a control application is installed on each control and/or computer unit, and connection to a control system is subsequently established via a communication network, a detection call is used to identify power supply components and all control applications installed on the control and/or computer units, the power supply components are then assigned identified control applications installed on the control and/or computer units supplied by a particular power supply component, assignments between power supply components and identified control applications are saved centrally or locally, power supply components being monitored for event alarms, and upon an event alarm within a power supply component, the assigned control application initiates a definable action, or a shutdown, on the control and/or computer unit.

20 Claims, 2 Drawing Sheets

(51) Int. Cl.
  *G05B 19/042* (2006.01)
  *G06F 1/3287* (2019.01)
  *G06F 1/3206* (2019.01)

(56) References Cited

U.S. PATENT DOCUMENTS

| | | | | |
|---|---|---|---|---|
| 2005/0097374 | A1* | 5/2005 | Aharonian | G06F 1/3246 |
| | | | | 713/300 |
| 2006/0047979 | A1* | 3/2006 | Hsu | G06F 1/30 |
| | | | | 713/300 |
| 2012/0017102 | A1* | 1/2012 | Turicchi, Jr. | G06Q 50/06 |
| | | | | 713/300 |
| 2014/0164812 | A1* | 6/2014 | Alshinnawi | G06F 1/188 |
| | | | | 713/330 |
| 2017/0302525 | A1* | 10/2017 | Chen | H04L 45/00 |
| 2017/0353346 | A1* | 12/2017 | Pfeffer | H04L 43/0817 |

FOREIGN PATENT DOCUMENTS

| | | |
|---|---|---|
| EP | 2869154 | 5/2015 |
| EP | 2876778 | 5/2015 |

\* cited by examiner

METHOD FOR MONITORING, CONTROL AND GRACEFUL SHUTDOWN OF CONTROL AND/OR COMPUTER UNITS

BACKGROUND OF THE INVENTION

1. Field of the Invention

The present invention relates to a method for monitoring, control and graceful shutdown of control and/or computer units of at least one system comprising power supply components, in particular electrical power supplies, electrical safety devices or uninterruptible power supplies, which ensure a supply of power to the control and/or computer units.

2. Description of the Related Art

An automation system, or system for short, generally refers to an entirely or partially automated industrial system for making products or for controlling processes. For making products or for controlling processes, industrial systems usually comprise control and/or computer units, such as what are known as industrial PCs and/or intelligent electronic, mostly microprocessor-based, devices (e.g., control devices, protective devices, pressure and temperature transducers, flowmeters, actuators or programmable logic controllers) that control, monitor and/or supervise system-internal and/or system-specific processes.

Power supply components are used in a system to supply power to the control and/or computer units. In this context, power supply components refer to all the components in a current path, for instance electrical power supplies and/or switched mode power supplies, electrical safety devices, uninterruptible power supplies, energy storage devices (e.g., rechargeable battery, capacitor or superconducting magnetic energy storage device) or metering units, which monitor, control and ensure the supply of power via this current path to the relevant control and/or computer unit and hence ensure that procedures in the system run with minimum disruption.

For a procedure in an automation system to run with minimum disruption, it is also necessary to intercept unexpected outages in the power supply of the control and/or computer units, and to prevent damage such as data losses resulting from disruptions in the current path or in the supply of power. Such disruptions may arise, for example, as a result of an unexpected outage or malfunction of the power supply grid or as a result of a fault (e.g., failure or switch-off caused by overheating) in a power supply component in the current path of the particular control and/or computer unit.

In order to guarantee operation of the electrical system irrespective of faults and/or outages in the power supply grid and/or in the current path, what are known as uninterruptible power supplies (UPS) are used as the power supply components for critical loads, such as control and/or computer units that have an information processing function. The UPS is used to provide, in the event of a malfunction or outage of the supply of power, an alternative supply of power for the respectively connected control and/or computer unit via one or more energy storage modules (e.g. rechargeable battery modules or batteries). The supply of power to a control and/or computer unit by the energy storage devices of a UPS has the disadvantage that the energy storage device(s) can only ensure the supply of power for a certain period. Especially for prolonged faults or outages of the power supply, problems (e.g. data losses or uncontrolled shutdown) may again occur in the control and/or computer units, for example, as a result of reserve power in the UPS running low.

To prevent such problems, a graceful shutdown of control and/or computer units in the event of faults and outages in the power supply would be desirable, similar to the case of mobile terminals (e.g., laptop, cell phone or smartphone) under battery operation. Mobile terminals under battery operation perform certain actions when reserve battery power is getting lower, for instance. These actions range from, for example, reducing the power consumption (e.g., reducing the display brightness or closing applications) through sending warnings that the reserve battery power has dropped below set thresholds, to graceful switch-off of the mobile terminal when the reserve battery power drops below a minimum level, in which it is usual practice to close applications properly that are still running and to save data before the device is switched off.

EP 1 832 955 A1 discloses, for example, an uninterruptible power supply system in which a server unit is supplied with power from two uninterruptible power supplies. In this case, the two power supplies are connected to the server unit via a communication network and communicate with the server unit if a fault is ascertained in the supply grid or if one or both power supplies are switched to battery mode. This is achieved by initiating a shutdown of the server unit after a wait time stored in the server unit has elapsed. Although a server unit connected directly to the power supplies can be shut down in an orderly manner via the power supply system in the event of a fault in the power supply grid, the solution presented in EP 1 832 955 A1 publication is less suitable and too costly for preventing data losses in a plurality of control and/or computer units caused by disruptions in the supply of power. Such a power supply system must be provided, for instance, for each control and/or computer unit of a system. In addition, it is not possible to take into account, for example, chronologically required sequences in the shutdown of a plurality of control and/or computer units, and in the event of a fault, additional monitoring and communication tasks such as generating messages, for instance, place a load on the power supplies.

Patent EP 2 787 405 B1 and patent EP 2 876 778 B1 describe, for example, methods for operating an electrical installation comprising a plurality of electrical loads, which in the event of failure of a supply voltage are connected to a backup voltage of an uninterruptible power supply in order to ensure the supply to the loads for a time period or backup phase. The intention is that during the backup phase, the electrical loads can be switched off in a controlled manner, or are able to prepare themselves in advance for an imminent switch-off. The loads are provided with a software module for this purpose. A load, or more precisely the associated software module, is configured as a master. The software modules of the other loads are set as slaves in the sense of master/slave communication, and the master is registered in the power supply as the communication partner for performing the controlled switch-off process. In the event of a fault in the supply voltage, i.e., upon switching over to the backup voltage, the power supply notifies the master of this event, thereby starting the controlled switch-off process or switch-off sequence. It should be noted here, however, that the slaves must be switched off before the master, i.e., a wait time (i.e., the time until the controlled switch-off starts), must be shorter, e.g., for the slaves than for the master. In addition, the method involves relatively complex communication and time-consuming administration, because it must be configured separately for each uninterruptible power supply of a system and the loads associated with each. Moreover, when switching off a plurality of loads in accordance with the method from document EP 2 787 405 B1 or from document EP 2 876 778 B1, errors in the configuration and consequently errors when switching off the loads can arise particularly because of the master/slave principle for the communication. Furthermore, the direct communication with the load configured as the master places an extra load on the uninterruptible power supply.

SUMMARY OF THE INVENTION

In view of the foregoing, it is therefore an object of the invention to provide an improved method for monitoring, control and graceful shutdown of control and/or computer units of at least one system.

This and other objects and advantages are achieved in accordance with the invention by a method for monitoring, control and graceful shutdown of control and/or computer units of at least one system, where the control and/or computer units are supplied with power via power supply components such as electrical power supplies and/or switched mode power supplies, electrical safety devices, uninterruptible power supplies, energy storage devices (e.g., rechargeable battery, capacitor or superconducting magnetic energy storage device) or metering units, etc. In accordance with the method, a control application is installed on each control and/or computer unit of the at least one system. A connection to a control system for power supply components is established via a communication network. A detection call is then used to identify, in addition to the power supply components of the at least one system, the control applications installed on the control and/or computer units of the at least one system, and the power supply components of the at least one system are assigned the respective identified control applications.

Put differently, a power supply component is primarily assigned the control applications of those control and/or computer units that are supplied with power by this power supply component. There is also the option to configure an assignment between a power supply component and one or more control applications if disruption in the supply of power in the case of this power supply component has an indirect impact on the associated control and computer unit(s).

The configured assignments between the power supply components and identified control applications are then saved, and the power supply components monitored for event alarms (e.g., disruption in the supply of power, fault in the assigned power supply component such as overheating or failure, switchover to backup mode for an uninterruptible power supply or low battery status for uninterruptible power supply). On one or more event alarms occurring in one of the power supply components of the at least one system, the respectively assigned control application(s) initiate at least one definable action on the associated control and/or computer units, such as waiting for a definable backup period, initiating energy saving measures, preparing for shutdown (e.g., closing applications and/or saving data) or performing shutdown.

The main aspect of the solution proposed by the invention is that a control system for power supply components finds and detects all the control applications that are installed and available on the respective control and/or computer units of the at least one system. In addition, an assignment to the power supply components is made centrally via the control system for power supply components, thereby allowing time-saving and flexible configuration and administration. Moreover, by virtue of the method in accordance with the invention, there is no need to distinguish between two types of control applications or control and/or computer units for the shutdown (e.g., master/slave). In the method in accordance with the invention, each power supply component is assigned at least the control applications of the control and/or computer units supplied with power directly by this power supply component.

In addition, a frequency of errors, especially in the assignment, is reduced because data both on the power supply components available and/or used in the system and on the available control applications is available via the control system for power supply components. The assignments between power supply components and control applications can thus be made simply and flexibly, such as based on a system diagram. In addition, for example, wait times and/or necessary shutdown times of individual control and/or computer units can be taken into account very easily. If applicable, it is possible to check during the assignment whether, for example, control and/or computer units must be shut down in a defined sequence or order. Furthermore, using the control system for power supply components and assigning centrally allows a reduction in a communication load on the individual power supply components and for the control and/or computer units.

It is advantageous if, for assigning the power supply components to the control applications, in addition to the power supply components of the at least one system, the control applications identified by the control system for power supply components are then output on at least one input/output unit. The at least one input/output unit can be connected to the control system for power supply components. For instance, the input/output unit can be connected to the control system via an application, in particular a web application. A standard Internet or web browser, for example, can be used as the user interface for output or display of the identified power supply components and control applications and for performing the assignment. Hence, for example, a stationary PC, stationary PC systems and mobile terminals (e.g., tablet PC or hand-held) can be used for the input/output unit or as a display without additional expense and without restrictions. It is also possible to make use of cloud computing which, for example, via applications provides the input/output unit or the output of the power supply components and control applications and an assignment functionality.

It is also advantageous if, after the assignment between power supply components and identified control applications, configuration parameters and/or definable actions are then entered or set for the particular control application. This can be done, for instance, via the at least one input/output unit, which is connected to the control system for power supply components. The configuration of the particular control application can thus be adjusted, for instance, to suit the respectively assigned power supply component. It is hence possible, for instance, to set configuration parameters, such as backup times, or wait times, in the event of an event alarm, such as "power supply switching to backup or battery mode". During these backup times or wait times, the control application cannot, for instance, initiate any actions or preparatory actions for shutting down the control and/or computer unit.

In addition, it is possible to set actions to be initiated on the occurrence of certain event alarms in a power supply component for the associated control application. Thus, for example, in the event of a power supply component switching off/failing, for instance, because of overheating or disruptions in the power supply grid, an immediate shutdown of the supplied control and/or computer units can be set as the action. For an uninterruptible power supply as the assigned power supply component, the backup mode (i.e., switching over to battery mode) can be taken into account, for example, when setting the definable actions for the relevant control applications. In other words, the relevant control and/or computer unit can be instructed by the associated control application, for instance, in the event of an event alarm "switchover to backup mode" for the power supply, to initiate energy saving measures (e.g., dimming or switching off display units), to close applications, etc., and to start a graceful shutdown only in the event of an event alarm "battery status low" for the power supply and/or after a defined wait time has elapsed.

In accordance with an advantageous embodiment of the method in accordance with the invention, authentication is provided for the assignment between power supply components and identified control applications and/or for entering configuration parameters and/or definable actions of the control applications. Ideally, different user roles can define the scope of displayed data (e.g., identified power supply components and/or control applications) and/or permitted assignment and/or configuration options. This provides a simple and efficient way of restricting access, for instance, via the at least one input/output unit, to the data and assignment and configuration options or to the control system for power supply components, and of protecting against tampering and unauthorized accesses. A user name with associated password can be used, for example, for authentication. In addition, by defining different user roles, different views of power supply components and control applications can be offered, such as restrictions to specific system segments, to one or more systems or output of data for diagnostic purposes only.

Ideally, a control system comprising a central server unit having an associated database, local server units permanently assigned to the power supply components, and client units for each local server unit is used as the control system for power supply components. Unpublished European patent application EP 18156846.0 discloses such a control system for power supply components. Such a control system has the advantage that a load placed on the power supply components by data communication and data processing is minimized, for example, because data on the power supply components can be provided by the control system and need not be retrieved directly from the respective power supply components. The control system and, in particular, the central server unit having the associated database thus constitute a form of "data hub" for assignment, administration and configuration of the control applications available in at least one system, which significantly reduces the communications and data-handling load on the individual power supply component but also on the respective control applications.

Moreover, the communications and data-processing architecture of the control system allows a freely scalable server-client relationship, ideally an n-to-m relationship. For assignment, administration and configuration of control applications, access is made to the control system, for instance, via at least one input/output unit via client applications. Configuration, capacity, etc. of the control system, in particular of the central server unit, for example, define the number of these client applications, which hence does not depend on the number of power supply components and control applications identified by the control system. In addition, such a control system, as described in the as-yet unpublished European patent application EP 18156846.0, has the advantage that it can run on different hardware architecture variants (e.g., stationary PC system, distributed computer system or cloud computing) without functional limitations. Hence, using the control system, it is extremely easy to establish a connection to at least one system, or more precisely to its power supply components and control applications, via a communication network (e.g. Ethernet).

Ideally, for each identified control application, a client unit for communication between the identified control application and the central server unit of the control system is created in the control system for power supply components. The control application on the particular control and/or computer unit then acts as a local server unit for communicating with the generated client unit. The client unit may be created, for example, based on a template.

In accordance with a preferred embodiment of the method in accordance with the invention, the assignments between the power supply components and the identified control applications are saved centrally in the control system for power supply components. Ideally, the monitoring of the power supply components for event alarms is likewise performed by the control system for power supply components. In this case, the entire communication from the power supply component to the respectively assigned control applications occurs via the control system for power supply components, thereby reducing in particular the communications and data-handling load on the individual power supply component. In addition, this embodiment of the method in accordance with the invention offers the facility of assigning to a power supply component also control applications that are installed on control and/or computer units that are affected only indirectly by a fault in this power supply component, for instance, assignments between power supplies and control applications of different, e.g., cascaded, segments of a system.

It is also advantageous if a change to the configuration parameters and/or definable actions of the particular control application is performed centrally via the control system for power supply components, such as via an input/output unit that can be connected to the control system. In this case, the changes can be made without major effort, such as via a central input/output unit, and then transferred to the relevant control application. It is also possible to check parameter changes or changes to definable actions before the transfer to the particular control application, for consistency, plausibility and/or possible errors (e.g., wait time too long, taking into account the shutdown of one or more other control and/or computer units, etc.).

Advantageously, with central monitoring by the control system for power supply components, data on event alarms is collected centrally on the control system for diagnostic purposes. In this case, event alarms received from power supply components, for instance, event alarms, such as disruption to the power supply, power supply component overheating, power supply component being switched off, switchover to backup mode for an uninterruptible power supply (UPS), battery status of a UPS e.g., low, disruption to the power supply has ended, etc., can be output or displayed, for example, and then, if applicable, collected, together with a time stamp, for instance, in what is called a log file. The collected event alarms or the log files can then be retrieved and analyzed for diagnostic purposes, such as via the at least one input/output unit of the control system.

It is thereby easy to ascertain whether faults are occurring frequently for certain power supply components or in certain current paths.

As an alternative to central storage of the assignments and central monitoring by the control system for power supply components, the assignments between the power supply components and the identified control applications can be stored locally in the particular control application and/or in the respectively assigned power supply component. Once the assignment has been made, the connection to the control system for power supply components via the communication network can be disconnected again. In other words, a connection between control system and, e.g., a system is established only for identifying power supply components and control applications of this system, for the assignment between power supply components and control applications and, if applicable, for configuring the control application. This connection is subsequently disconnected. In this embodiment, the power supply components are monitored locally for event alarms by the respectively assigned control application(s). This still requires direct connections via a communication network between the power supply components and the respectively assigned control applications or control and/or computer units. For systems that have low processing power or few processing resources, for example, it is particularly suitable to store the assignments locally and monitor the power supply components for event alarms locally. In addition, for systems in which, in order to reduce risk, there is a deliberate aim to minimize application programs, it is also particularly suitable to store the assignment locally and monitor the power supply components for event alarms locally. Such systems are used, for example, for highly specific functions or task areas, and as few as possible to no additional applications are meant to impact on such systems.

Changes to configuration parameters and/or definable actions for the particular control application can ideally also be made locally, in particular via an input/output unit of the associated control and/or computer unit. It is thereby possible, for instance, to adjust configuration parameters and/or action sequences in the event of an event alarm on an assigned power supply component very easily directly in the control application.

It is also advantageous if data on event alarms from power supply components is collected locally by the respectively assigned control application for diagnostic purposes. It is thereby possible, for example, to retrieve directly at the associated control and/or computer unit, which event alarms have been ascertained by the respectively installed control application and/or what definable actions have been taken.

In an advantageous embodiment of the method in accordance with the invention, for a communication connection between the control system for power supply components and the control application, an Open Platform Communications-Unified Architecture (OPC-UA) interface is used for data transfer. Using an OPC-UA interface for the communication allows communication based on an open standard that is not manufacturer-specific or device-specific. In addition, by authentication and authorization, encryption and data integrity by signing, e.g., via the specified firmware of the associated power supply component, OPC-UA provides appropriate security for the data transfer and a certain degree of protection from tampering.

Ideally, the Discovery and Configuration Protocol (DCP) is used for transmitting a detection call. The Discovery and Configuration Protocol, or DCP for short, is a protocol definition in the context of PROFINET, an open industrial Ethernet standard used for automation. Thus, with DCP it is easily possible for power supply components of at least one automation system that are connected via a communication network (e.g., Ethernet), and the control applications installed on the control and/or computer units of the at least one automation system, to be detected simply and quickly, or more precisely to be discovered via a "multicast" sent via a control system for power supply components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below with reference to the accompanying figures by way of example, in which.

DETAILED DESCRIPTION OF THE EXEMPLARY EMBODIMENTS

Figure 1:
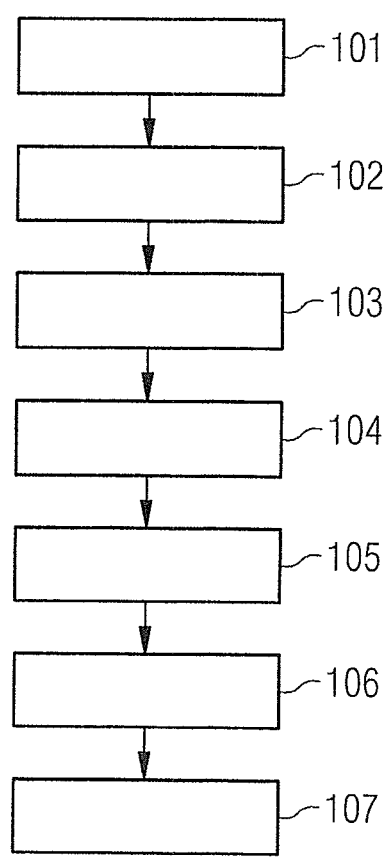
FIG. 1 shows schematically an exemplary flow of the method for monitoring, control and graceful shutdown of control and/or computer units of at least one system in accordance with the invention.

FIG. 1 schematically shows an exemplary flow of the method for monitoring, control and graceful shutdown of control and/or computer units of at least one system in accordance with the invention. In this method, the control and/or computer units of the at least one system are supplied with power by power supply components of the at least one system. In order to ensure a safe and graceful shutdown of a control and/or computer unit in the event of a fault in the associated current path or in the supplying power supply component, a control application is installed on each control and/or computer unit in an installation procedure 101. In a procedure for establishing communication 102, a connection is established via a communication network (e.g. Ethernet), for instance, between the at least one system, or more precisely between the power supply components and installed control applications of the at least one system, and a control system for power supply components. The power supply components and the control and/or computer units comprising the installed control applications are likewise meant to have a connection to the communication network (e.g. Ethernet).

For example, a control system such as that described in the as-yet unpublished European patent application EP 18156846.0 can be used as the control system for power supply components. Such a control system comprises a central server unit having an associated database, local server units permanently assigned to the power supply components of the at least one system, and client units for each local server unit.

During a detection procedure 103, the control system for power supply components transmits a detection call via the communication network. The power supply components connected to the communication network, and the control applications available on the control and/or computer units, are addressed by the detection call. The detection call is transmitted, for example, in the form of a "multicast", in which the Discovery and Configuration Protocol (DCP), is used, for example. In the detection procedure 103, the power supply components and the control applications send back response messages, for instance, containing unique identification data (e.g. MAC address of the power supply component or of the control and/or computer unit of the control application, a device name and/or identifier or an IP address) to the control system, thereby identifying the power supply components and control applications.

For each identified control application, for example, in the control system for power supply components, a client unit can be created for communication between the respectively identified control application and the control system, in particular the central server unit of the control system for power supply components. For instance, a template can be used for creating the client unit. The control application then assumes the function of the local server unit for communicating with the respectively generated client unit.

The identified power supply components and control applications of the at least one system can then be displayed and/or output via an input/output unit, for example, for an assignment procedure 104. The input/output unit can be connected to the control system for power supply components, for instance, via an application or web application. The identified power supply components and control applications are then, for example, displayed and/or output in a standard web browser as user interface, in which case a stationary PC, stationary PC systems and/or mobile terminals (e.g. tablet PC or hand-held), for instance, can be used for the input/output unit without restrictions.

In the assignment procedure 104, the identified power supply components are then assigned the respective identified control applications. This means that a power supply component identified by the control system is assigned at least one control application that is installed on a control and/or computer unit supplied with power by this power supply component. If a plurality of control and/or computer units are supplied by one power supply component (e.g. power supply or uninterruptible power supply), then all the control applications installed on these control and/or computer units can be assigned to this power supply component. In addition, there is the option to also configure assignments between power supply components and control applications of control and/or computer units that have, for instance, only an indirect impact on each other in the event of faults. Thus, for example, the failure of the power supply in a system segment or in a system may affect a preceding and/or subsequent system segment or a preceding and/or subsequent system such that also in the preceding and/or subsequent system segment or in the preceding and/or subsequent system, control and/or computer units must be shut down, possibly even though there is a working power supply.

In addition, there is the option in the assignment procedure 104, once the assignment between the power supply components and the control applications has been made, to set configuration parameters and/or definable actions for the control applications, for instance, depending on the respective power supply components and on event alarms that occur in the respectively assigned power supplies. For instance, backup times, for example, what is known as a dead time (waiting for the control application without action), a wait time (preparing for a shutdown by the control application), etc., can be set as configuration parameters for the control application. In addition, actions, for instance, no action in the dead time, initiating energy saving measures in backup mode of the power supply, closing applications, saving data, or shutting down the control and/or computer unit, can be assigned individually or as a sequence to be executed (e.g., in the form of batches) to specific event alarms.

Like the assignment, entering the configuration parameters and/or the definable actions of the control application concerned can be performed via the input/output unit. In this process, the settings (parameters, actions) for the control application concerned can be displayed, for instance, via the web application and/or via the web browser. In addition, the inputs can be checked for plausibility.

An authentication, for instance, via user name and password, can be provided for performing the assignment procedure 104, i.e., for assigning power supply components and control applications and/or for entering the configuration parameters and actions especially via the input/output unit. The scope of the displayed data (e.g., power supply components, control applications, or parameters) and permitted configuration options (e.g., display/read access only, feasible assignments, or parameter changes) can be defined in this case by different user roles. If, for example, in the assignment procedure 104 no configuration parameters are entered for a control application and/or definable actions are set for certain event alarms, then the control system can define default values and/or default actions.

After the assignment procedure 104, the assignments between the power supply components and the control applications are then saved in a save procedure 105, and as well as any configurations of the control applications made. In a monitoring procedure 106, the power supply components are then monitored for occurring event alarms.

Figure 2:
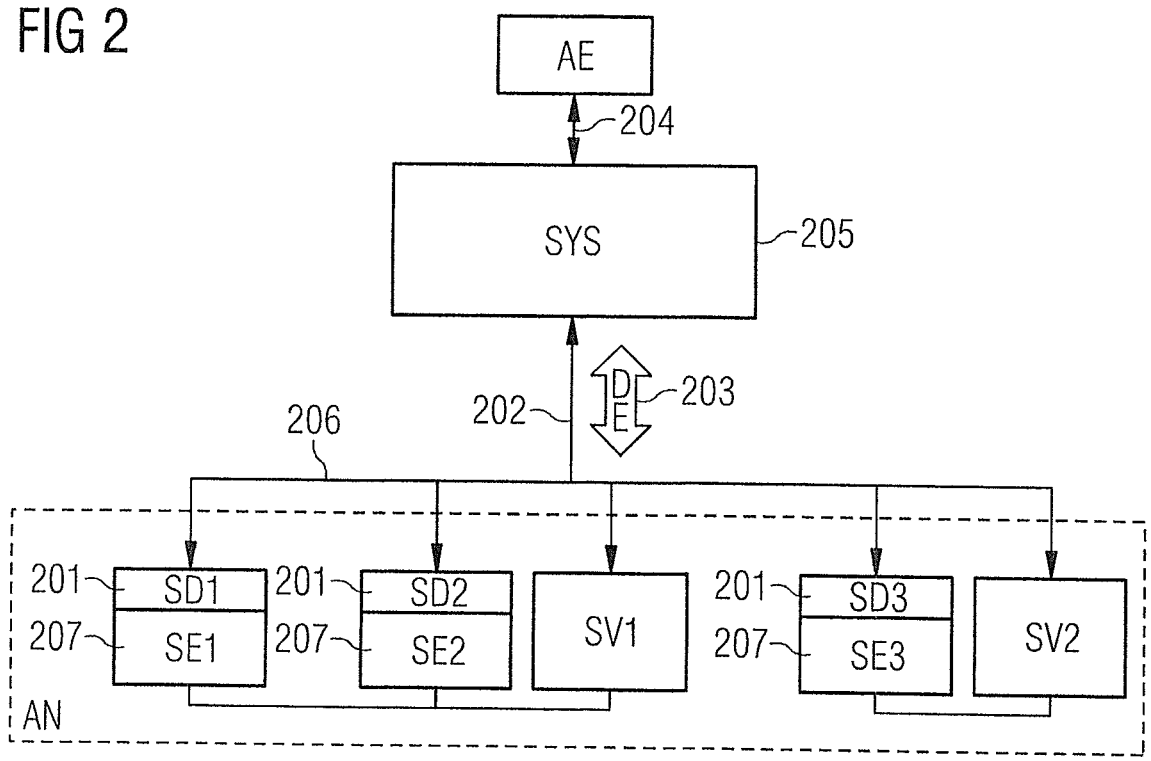
FIG. 2 shows an exemplary embodiment of the method in accordance with the invention for monitoring, control and graceful shutdown of control and/or computer units, where a central monitoring of the power supply components is provided.

In an embodiment of the method in accordance with the invention, as shown in FIG. 2 by way of example, saving the assignments in the save procedure 105 and monitoring the power supply components for event alarms in the monitoring procedure 106 can be performed centrally in the control system for power supply components, with the control system in this embodiment having permanent communication connections to the power supply components and the control applications, for instance, via an OPC-UA interface.

Figure 3:
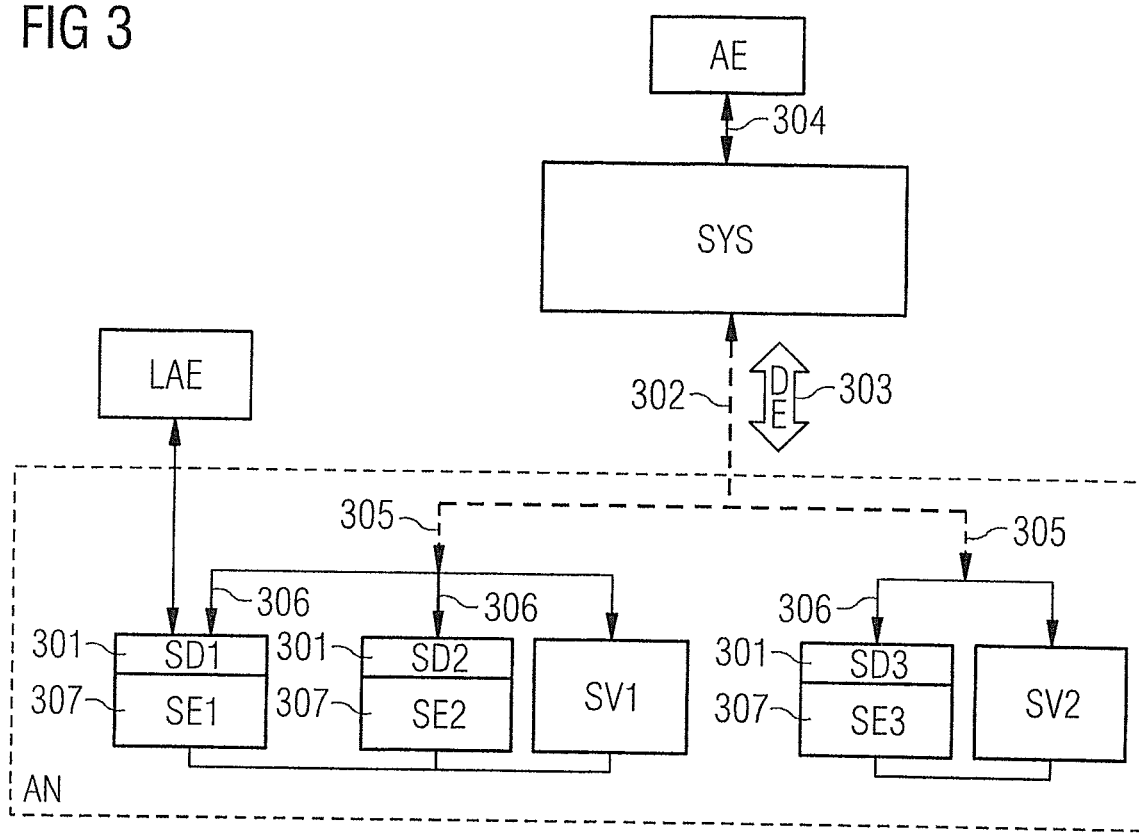
FIG. 3 shows another exemplary embodiment of the method in accordance with the invention for monitoring, control and graceful shutdown of control and/or computer units, where local monitoring of the power supply components is provided.

Alternatively, for instance, as in the embodiment of the method in accordance with the invention shown in FIG. 3 by way of example, saving the assignments in the save procedure 105 and monitoring the power supply components in the monitoring procedure 106 can be performed locally in the relevant control application. In this embodiment, after the save procedure 105, the connection of the control system for power supply components via the communication network to the power supply components and control applications is disconnected. Nonetheless, there must still be local communication connections via a communication network (e.g., Ethernet) between the power supply components and the respectively assigned control applications. For instance, in this case, the power supply component can comprise a local server unit for the local communication, and the control application can assume a client function.

In an implementation procedure 107, on the occurrence of an event alarm (e.g., switchover of the power supply into buffer mode, low battery status, overheating of the power supply component, or switch-off of the power supply) in a power supply component, all the control applications assigned to this power supply component initiate the relevant definable or configured actions on the associated control and/or computer unit. The actions can be executed, for example, as a command-line-based application or as a batch file, in particular if a plurality of actions are meant to be performed. In parallel with initiating one or more actions, the control application can send, for instance, an alarm or an alarm message to an input/output unit.

This means that by virtue of the method in accordance with the disclosed embodiments of the invention, especially for a prolonged disruption to the supply of power, the control and/or computer units affected can shut down gracefully and, for instance, taking into account the respective shut-down times. Once the disruption in the supply of power has come to an end, a special event alarm (e.g. "supply of power restored"), for instance, can restart the control and/or computer units concerned, such as by emitting a voltage pulse.

FIG. 2 shows by way of example an embodiment variant of the method in accordance with the invention, in which central monitoring of the power supply components SV1, SV2 is provided and there is a permanent communication connection to the control system SYS for power supply components SV1, SV2. FIG. 2 also shows an exemplary system AN, which comprises two power supply components SV1, SV2 by way of example. Control and/or computer units SE1, SE2, SE3, for example, are supplied with power by the power supply components SV1, SV2. Here, a first power supply component SV1 supplies power to a first and second control and/or computer units SE1, SE2, for instance, and a second power supply component SV2 supplies power to a third control and/or computer unit SE3, for instance.

In the installation procedure 201, a control application SD1, SD2, SD3 is respectively installed on each control and/or computer unit SE1, SE2, SE3. In the procedure for establishing communication 202, a communication connection to the control system SYS for power supply components SV1, SV2 is established via a communication network. This can be achieved, for example, by connecting the control system SYS to the communication network (e.g., Ethernet) to which is connected the system AN, or more precisely the power supply components SV1, SV2 and the control and/or computer units SE1, SE2, SE3. In the detection procedure 203, the control system SYS transmits a detection call DE (e.g., a multicast via the DCP protocol) via the communication network. In response to the detection call DE, the power supply components SV1, SV2 and the control applications SD1, SD2, SD3 installed on the control and/or computer units SE1, SE2, SE3 send response messages to the control system SYS, thereby identifying at the control system SYS the power supply components SV1, SV2 and the control applications SD1, SD2, SD3.

In the assignment procedure 204, the assignment is then made between the identified power supply components SV1, SV2 and the identified control applications SD1, SD2, SD3 of the example system AN. In this process, for example, the first power supply component SV1 is assigned the control applications SD1, SD2 installed on the control and/or computer units SE1, SE2 supplied by the first power supply component SV1, SV2. The second power supply component SV2 is assigned, for instance, the control application SD3 installed on the control and/or computer unit SE3 supplied by the second power supply component SV2. If, for example, a fault in the first power supply component SV1 has an indirect impact on the third control and/or computer unit SE3, for example, the first power supply component SV1 can also be assigned the control application SD3 installed on the third control and/or computer unit SE3. This also applies analogously to the control applications SD1, SD2 installed on the first and/or second control and/or computer units SE1, SE2 should a fault in the second power supply component SV2 also have an at least indirect impact on these control and/or computer units SE1, SE2.

The assignment between the power supply components SV1, SV2 and the control applications SD1, SD2, SD3 and, if applicable, an input of configuration parameters and/or definable actions for the control applications SD1, SD2, SD3 in the assignment procedure 204 can be performed, for example, via an input/output unit AE connected to the control system SYS. Once the control applications SD1, SD2, SD3 have been assigned and, if applicable, configured, the assignments are saved centrally in the control system SYS for power supply components SV1, SV2 in the save procedure 205. For instance, when using the control system SYS described in the as-yet unpublished European patent application EP 18156846.0, the database assigned to the central sever unit can be used for this purpose. Any configurations of the control applications SD1, SD2, SD3 that may have been made can, for instance, likewise be saved centrally and/or transmitted to the respective control applications SD1, SD2, SD3 via the communication network, such as via an OPC-UA interface.

In the monitoring procedure 206, the power supply components SV1, SV2 are then monitored centrally by the control system SYS via the existing communication connection (e.g. via OPC-UA) for the occurrence of disruptions in the supply of power and associated event alarms. During the monitoring procedure 206, the control system can collect and save data on event alarms for diagnostic purposes. This data can be retrieved and analyzed, for example, via the input/output unit AE connected to the control system SYS.

In the event of detection by the control system SYS during the monitoring procedure 206, for instance, in the first or second or in both power supply components SV1, SV2, then the control system SYS addresses the respectively assigned control applications SD1, SD2, SD3 based on the saved assignments. In the implementation procedure 207, the addressed control applications SD1, SD2, SD3 initiate on the respective associated control and/or computer units SE1, SE2, SE3 the actions defined or configured in each case. In the event of a disruption that exceeds, for instance, a configured dead time of the particular control application SD1, SD2, SD3, the associated control and/or computer units SE1, SE2, SE3 can be shut down gracefully. In addition, during the implementation procedure 207, the control applications SD1, SD2, SD3 can transmit, for instance, alarms or alarm messages that can be displayed on the input/output unit AE, for example, or can be output to a service employee, for instance, on a mobile terminal.

Changes or adjustments to the configurations of the control applications SD1, SD2, SD3 (e.g., changes to the configuration parameters and/or to the defined actions for the implementation procedure 207) can be made, for example, via the control system SYS or via the input/output unit AE connected to the control system SYS. The changes and adjustments can likewise be saved centrally in the control system SYS and, if applicable, transferred to the relevant control application SD1, SD2, SD3 for processing.

FIG. 3 shows an exemplary embodiment of the method in accordance with the invention, in which local monitoring of the power supply components SV1, SV2 is provided. In this embodiment, there is no need for a permanent communication connection to the control system SYS for power supply components SV1, SV2. Nevertheless, there must still be communication connections between the respective control and/or computer units SE1, SE2, SE3 and the monitored power supply components SV1, SV2.

FIG. 3 again shows the exemplary system AN comprising by way of example two power supply components SV1, SV2, in which again, by way of example, the first power supply component SV1 supplies power to the first and second control and/or computer units SE1, SE2, and the second power supply component SV2 supplies power to the third control and/or computer unit SE3. In the installation procedure 301, a control application SD1, SD2, SD3 is installed on each of the control and/or computer units SE1, SE2, SE3 respectively, and in the procedure for establishing communication 302, a communication connection to the control system SYS for power supply components SV1, SV2 is established via a communication network.

As in FIG. 2, in the detection procedure 303, the control system SYS transmits a detection call DE (e.g., a multicast via the DCP protocol) via the communication network. In response to the detection call DE, the power supply components SV1, SV2 and the control applications SD1, SD2, SD3 installed on the control and/or computer units SE1, SE2, SE3 send response messages to the control system SYS, thereby identifying at the control system SYS the power supply components SV1, SV2 and the control applications SD1, SD2, SD3. During the assignment procedure 304, an assignment is again made between the identified power supply components SV1, SV2 and the identified control applications SD1, SD2, SD3 of the exemplary system AN. The assignment and, if applicable, configuration of the control applications SD1, SD2, SD3 (input of configuration parameters and actions) can be performed, for instance, via the input/output unit AE connected to the control system SYS.

The assignment 304, however, must take into account that there is a direct communication connection between the control application SD1, SD2, SD3 and assigned power supply component SV1, SV2. In the exemplary embodiment shown in FIG. 3, there are, for instance, communication connections between the first power supply component SV1 and the control applications SD1, SD2 installed on the first and second control and/or computer units SE1, SE2 and the second power supply component SV2 and the control application SD3 installed on the third control and/or computer unit SE3. This means that, for example, only an assignment between first power supply component SV1 and the control applications SD1, SD2 of the first and second control and/or computer units SE1, SE2, and respectively an assignment between the second power supply component SV2 and the control application SD3 of the third control and computer unit SE3 is practical.

Once assignment is complete, in a save procedure 305, the entered assignments between the identified power supply components SV1, SV2 and the identified control applications SD1, SD2, SD3 are first transmitted by the control system SYS to the respective control applications SD1, SD2, SD3 and power supply components SV1, SV2. An OPC-UA interface, for example, can be used for the communication. The respective assignments are then saved locally at the relevant control application SD1, SD2, SD3 and/or on the relevant power supply component SV1, SV2. Any configuration parameters and/or actions entered in the assignment procedure 304 are likewise transmitted to the relevant control application SD1, SD2, SD3 and saved locally. Once the assignments have been saved locally, the communication connection of the control system SYS to the communication network or to the power supply components SV1, SV2 and to the control and computer units SE1, SE2, SE3 or to the associated control applications SD1, SD2, SD3 can be disconnected.

In the monitoring procedure 306, the power supply components SV1, SV2 are then monitored locally for the occurrence of event alarms by the respectively assigned control applications SD1, SD2, SD3 via the associated communication connection. In other words, the first power supply is monitored, for example, by the assigned control applications SD1, SD2 of the first and second control and computer units SE1, SE2. The second power supply component SV2 is monitored, for example, by the assigned control application SD3 of the third control and/or computer unit SE3. For this purpose, for example, the first and/or second power supply SV1, SV2 can comprise local server units or server functions, and the assigned control applications SD1, SD2, SD3 can act as a client unit, for example.

Upon the occurrence of an event alarm on the first and/or the second power supply component SV1, SV2, then in the implementation procedure 307, the respective control applications SD1, SD2, SD3 initiate the respectively defined actions on the associated control and/or computer unit SE1, SE2, SE3, and, if applicable, in the event of a prolonged interruption in the power supply, shut down gracefully the particular control and/or computer unit SE1, SE2, SE3. The particular control application SD1, SD2, SD3 can output locally an alarm or an alarm message in the implementation procedure 307, for example.

A change to configuration parameters and defined actions for specific event alarms can be performed locally, for example, for the particular control application SD1, SD2, SD3. This can be done by using a local input/output unit LAE, as shown by way of example for the first control and/or computer unit SE1, and by changing or adjusting, for example, a configuration of the corresponding control application SD1.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring, control and graceful shutdown of at least one of control units and computer units of at least one system, at least one the control units and computer units being supplied with power via power supply components, the method comprising:

installing a control application on each of the at least one of control units and computer units of the at least one system;
establishing a connection to a control system for power supply components via a communication network;
utilizing a detection call to identify, in addition to the power supply components of the at least one system, control applications installed on at least one of the control units and computer units of the at least one system;
assigning the power supply components of the at least one system respective identified control applications;
saving assignments between the power supply components and the respective identified control applications;
monitoring the power supply components for event alarms; and
initiating, by the at least one assigned control application, at least one definable action on at least one of an associated control unit and an associated computer unit upon an event alarm occurring in a power supply component.

2. The method as claimed in claim 1, further comprising:
outputting for said assignment, in addition to the power supply components of the at least one system, the control applications identified by the control system for power supply components on at least one input/output unit;
wherein the at least one input/output unit is connected to the control system for power supply components.

3. The method as claimed in claim 1, further comprising:
entering at least one of (i) configuration parameters and (ii) definable actions for a particular control application after the assignment between power supply components and identified control applications.

4. The method as claimed in claim 2, further comprising:
entering at least one of (i) configuration parameters and (ii) definable actions for a particular control application after the assignment between power supply components and identified control applications.

5. The method as claimed in claim 1, wherein authentication is provided for at least one of (i) the assignment between power supply components and identified control applications and (ii) entering at least one of configuration parameters and definable actions of the control applications.

6. The method as claimed in claim 5, wherein different user roles define a scope of at least one of (i) displayed data and (ii) permitted configuration options.

7. The method as claimed in claim 1, wherein the control system for power supply components comprises a control system including a central server unit having an associated database, local server units permanently assigned to the power supply components and client units for each local server unit.

8. The method as claimed in claim 7, wherein a client unit for communication between the identified control application and the central server unit of the control system is created in the control system for power supply components for each identified control application.

9. The method as claimed in claim 1, wherein assignments between the power supply components and the identified control applications are saved centrally in the control system for power supply component; and wherein monitoring of the power supply components for event alarms is performed centrally by the control system for power supply components.

10. The method as claimed in claim 2, wherein a change to at least one of the (i) configuration parameters and (ii) definable actions of a particular control application are performed centrally via the control system for power supply components.

11. The method as claimed in claim 1, wherein data on event alarms is collected centrally on the control system for power supply components for diagnostic purposes.

12. The method as claimed in claim 1, wherein the assignments between the power supply components and the identified control applications are stored locally in at least one of (i) a particular control application and (ii) in a respectively assigned power supply component; and wherein once the assignment has been made, the connection to the control system for power supply components via the communication network is disconnected.

13. The method as claimed in claim 12, wherein the particular control application locally monitors the respectively assigned power supply component for event alarms.

14. The method as claimed in claim 12, wherein a change to at least one of (i) the configuration parameters and (ii) definable actions of the particular control application is performed locally.

15. The method as claimed in claim 13, wherein a change to at least one of (i) the configuration parameters and (ii) definable actions of the particular control application is performed locally.

16. The method as claimed in claim 14, wherein the change to at least one of (i) the configuration parameters and (ii) definable actions of the particular control application is performed via an input/output unit of at least one of (i) an associated control and an associated computer unit.

17. The method as claimed in claim 15, wherein the change to at least one of (i) the configuration parameters and (ii) definable actions of the particular control application is performed via an input/output unit of at least one of (i) an associated control and an associated computer unit.

18. The method as claimed in claim 12, wherein data on event alarms from power supply components is collected locally by a respectively assigned control application for diagnostic purposes.

19. The method as claimed in claim 1, wherein an Open Platform Communications (OPC) Unified Architecture (OPC-UA) interface is utilized for data transfer for a communication connection between the control system for power supply components and the control application.

20. The method as claimed in claim 1, wherein the Discovery and Configuration Protocol (DCP) is utilized for transmitting the detection call.

* * * * *